(12) United States Patent
Li

(10) Patent No.: US 10,845,836 B2
(45) Date of Patent: Nov. 24, 2020

(54) METHOD FOR TRACKING CONTROL OF MAXIMUM POWER POINT OF SOLAR CELL AND TRACKING DEVICE

(71) Applicant: GD MIDEA AIRCONDITIONING EQUIPMENT CO., LTD., Foshan (CN)

(72) Inventor: Hongtao Li, Foshan (CN)

( * ) Notice: Subject to any disclaimer, the term of this patent is extended or adjusted under 35 U.S.C. 154(b) by 440 days.

(21) Appl. No.: 15/557,129

(22) PCT Filed: Sep. 14, 2015

(86) PCT No.: PCT/CN2015/089559
§ 371 (c)(1),
(2) Date: Nov. 6, 2017

(87) PCT Pub. No.: WO2017/000388
PCT Pub. Date: Jan. 5, 2017

(65) Prior Publication Data
US 2019/0384340 A1 Dec. 19, 2019

(30) Foreign Application Priority Data
Jun. 30, 2015 (CN) .......................... 2015 1 0379129

(51) Int. Cl.
*H01M 10/44* (2006.01)
*H01M 10/46* (2006.01)
(Continued)

(52) U.S. Cl.
CPC ............... *G05F 1/67* (2013.01); *H02J 1/102* (2013.01); *H02J 3/385* (2013.01)

(58) Field of Classification Search
CPC .. G05F 1/67; H02J 1/102; H02J 3/385; Y02E 10/58
(Continued)

(56) References Cited

U.S. PATENT DOCUMENTS

| 5,932,994 A | 8/1999 | Jo et al. |
| 2010/0263711 A1 | 10/2010 | Kanai |

(Continued)

FOREIGN PATENT DOCUMENTS

| CN | 102291050 A | 12/2011 |
| CN | 102314190 A | 1/2012 |

(Continued)

OTHER PUBLICATIONS

CIPO Office Action dated May 16, 20181 in the corresponding CA application (application No. 2,975,412).
(Continued)

*Primary Examiner* — Zixuan Zhou
(74) *Attorney, Agent, or Firm* — Kilpatrick Townsend & Stockton, LLP

(57) ABSTRACT

Disclosed are a method and device for tracking control of a maximum power point of a solar cell, wherein an output voltage of the solar cell is converted to a voltage required by a load via a conversion module comprising a switching unit. The control method comprises: acquiring an open-circuit voltage of the solar cell; adjusting a duty cycle of the switching unit such that an output voltage of the solar cell decreases from the open-circuit voltage gradually in a first change direction; if the output voltage of the solar cell is less than or equal to a predetermined voltage value, reversely adjusting the duty cycle of the switching unit, wherein the predetermined voltage value is less than the output voltage of the solar cell corresponding to the maximum power of the solar cell; calculating a current output power of the solar cell.

8 Claims, 5 Drawing Sheets

(51) Int. Cl.
*G05F 1/67* (2006.01)
*H02J 1/10* (2006.01)
*H02J 3/38* (2006.01)

(58) Field of Classification Search
USPC .......................................................... 320/101
See application file for complete search history.

(56) References Cited

U.S. PATENT DOCUMENTS

| | | | |
|---|---|---|---|
| 2012/0262949 A1* | 10/2012 | Han | H02S 40/34 363/16 |
| 2013/0155739 A1* | 6/2013 | Itako | G05F 5/00 363/95 |
| 2014/0001859 A1 | 1/2014 | Shimura et al. | |
| 2014/0077608 A1 | 3/2014 | Nosaka et al. | |

FOREIGN PATENT DOCUMENTS

| | | |
|---|---|---|
| CN | 104238625 A | 12/2014 |
| EP | 2527948 A2 | 11/2012 |

OTHER PUBLICATIONS

European Office Action dated Apr. 26, 2018 in the corresponding European application (application No. 15896918.8).

* cited by examiner

METHOD FOR TRACKING CONTROL OF MAXIMUM POWER POINT OF SOLAR CELL AND TRACKING DEVICE

CROSS-REFERENCE TO RELATED APPLICATION

This application is a national phase entry under 35 USC § 371 of International Application PCT/CN2015/089559, filed Sep. 14, 2015, which claims priority to and benefits of Chinese Patent Applications Serial No. 201510379129.2, filed with the State Intellectual Property Office of P. R. China on Jun. 30, 2015, the entire contents of which are incorporated herein by reference.

FIELD

The present disclosure relates to photovoltaic power generation technology, and more particularly relates to a control method and an apparatus for tracking a maximum power point of a solar cell.

BACKGROUND

Photovoltaic power generation is a significant branch of a new energy technology. Since an output voltage and an output current of a photovoltaic cell may have a strong nonlinearity with a change of a solar irradiance and a cell junction temperature, there is a unique maximum output power point of the photovoltaic cell in a work environment. In order to make a full use of the solar energy, the photovoltaic array in the photovoltaic system is desired to work at the maximum power point. Therefore, maximum power point tracking (MPPT) of a solar cell is meaningful.

When the load is driven to work, the change of the power of the solar cell with the output voltage in a certain illumination condition is shown in FIG. 1, and the change of the output current with the output voltage is shown in FIG. 2. It can be seen that when the output voltage decreases from an open-circuit voltage (the voltage of the solar cell without a load) V0 of the solar cell, the power of the solar cell may reach the maximum power Pmax when the output voltage is V2, the output current of the solar cell may increase with the decreasing of the output voltage, and the output current may increase rapidly at the very beginning and then may increase slowly thereafter.

In the prior art of Maximum Power Point Tracking (MPPT), based on the voltage-current characteristics of the solar cell, it is generally to find the maximum output power of the solar cell, in other words, the output current of the solar cell is increased gradually by controlling a duty ratio of a switching transistor in an inverter, such that the output voltage of the solar cell may decrease gradually from the open-circuit voltage V0 and approach to V2. At the same time, it may be judged whether the output power P of the solar cell is increased; if yes, the duty ratio of the switching transistor in the inverter is controlled to be increased until the output power of the solar cell reaches the maximum power Pmax. However, since a slope of a curve between V1 and V2 (during which the voltage changes from a value greater than V2 to a value approximate to V2) shown in FIG. 1 is smooth and there may be errors during the power detection, it is often difficult to track the real maximum power point when computing the maximum power point according to the above method, and the computed maximum power point is usually less than the real maximum power point. For example, the power P1 corresponding to the output voltage V1 may be computed as the maximum power by using the above method.

SUMMARY

Embodiments of the present disclosure seek to solve at least one of the problems existing in the related art to at least some extent.

Accordingly, an objective of the present disclosure is to provide a control method for tracking a maximum power point of a solar cell. The control method may track the real maximum power point more easily.

Another objective of the present disclosure is to provide an apparatus for tracking a maximum power point of a solar cell.

In order to achieve the above objectives, embodiments of an aspect of the present disclosure provide a control method for tracking a maximum power point of a solar cell, in which an output voltage of the solar cell is converted to a voltage required by a load via a conversion module including a switching unit, and the control method includes: acquiring an open-circuit voltage of the solar cell; adjusting a duty ratio of the switching unit such that the output voltage of the solar cell decreases from the open-circuit voltage gradually in a first change direction; reversely adjusting the duty ratio of the switching unit when the output voltage of the solar cell is less than or equal to a preset voltage, such that the output voltage of the solar cell changes in a second change direction, wherein the preset voltage is less than an output voltage corresponding to a maximum power of the solar cell, and the first change direction is opposite to the second change direction; calculating a current output power of the solar cell, and comparing the current output power of the solar cell with a previous output power; and determining the previous output power as the maximum output power of the solar cell when the current output power is less than the previous output power.

With the control method for tracking a maximum power point of a solar cell according to embodiments of the present disclosure, the output voltage of the solar cell decreases from the open-circuit voltage gradually in a first change direction by controlling a duty ratio of the switching unit, and the output voltage increases gradually from a preset voltage by reversely adjusting the duty ratio of the switching unit when the output voltage of the solar cell is less than or equal to the preset voltage, thereby tracking the maximum power. Compared to the method for tracking the maximum power based on the output power of the solar cell directly in the prior art, the control method provided in the embodiments of the present disclosure may track the real maximum power more easily.

The presser voltage is 50%-75% of the open-circuit voltage of the solar cell.

Preferably, the preset voltage is 60%-70% of the open-circuit voltage of the solar cell.

Additionally, acquiring an open-circuit voltage of the solar cell also includes: acquiring an outdoor environment temperature, and calculating a change rate of the outdoor environment temperature; and periodically collecting the open-circuit voltage of the solar cell according to the change rate of the outdoor environment temperature.

After the maximum power of the solar cell is determined, the above control method further includes: controlling the duty ratio of the switching unit, such that the output voltage of the solar cell fluctuates within a first preset range of the output voltage corresponding to the maximum power and an output current of the solar cell fluctuates within a second preset range of an output current corresponding to the maximum power.

In order to achieve the above objectives, embodiments of another aspect of the present disclosure provide an apparatus for tracking a maximum power point of a solar cell. The apparatus includes: a conversion module including a switching unit, configured to convert an output voltage of the solar cell to a voltage required by a load; and a control module, configured to acquire an open-circuit voltage of the solar cell, to adjust a duty ratio of the switching unit such that the output voltage of the solar cell decreases from the open-circuit voltage gradually in a first change direction, to reversely adjust the duty ratio of the switching unit when the output voltage of the solar cell is less than or equal to a preset voltage, such that the output voltage of the solar cell changes in a second change direction, in which the preset voltage is less than an output voltage corresponding to a maximum power of the solar cell, and the first change direction is opposite to the second change direction, to calculate a current output power of the solar cell, and comparing the current output power of the solar cell with a previous output power, and to determine the previous output power as the maximum output power of the solar cell if the current output power is less than the previous output power.

With the apparatus for tracking a maximum power point of a solar cell according to embodiments of the present disclosure, the control module controls a duty ratio of the switching unit to enable the output voltage of the solar cell to decrease from the open-circuit voltage gradually in a first change direction, and reversely adjusts the duty ratio of the switching unit when the output voltage of the solar cell is less than or equal to the preset voltage to enable the output voltage to increase gradually from a preset voltage, thereby tracking the maximum power. Compared to the method for tracking the maximum power based on the output power of the solar cell directly in the prior art, the control method provided in the embodiments of the present disclosure may track the real maximum power more easily.

The presser voltage is 50%-75% of the open-circuit voltage of the solar cell.

Preferably, the preset voltage is 60%-70% of the open-circuit voltage of the solar cell.

Specifically, the apparatus also includes a temperature collecting module configured to acquire an outdoor environment temperature. The control module is configured to calculate a change rate of the outdoor environment temperature and to periodically collect the open-circuit voltage of the solar cell according to the change rate of the outdoor environment temperature.

After the maximum power of the solar cell is determined, the control module is also configured to control the duty ratio of the switching unit after the maximum power of the solar cell is determined, such that the output voltage of the solar cell fluctuates within a first preset range of the output voltage corresponding to the maximum power and an output current of the solar cell fluctuates within a second preset range of an output current corresponding to the maximum power.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
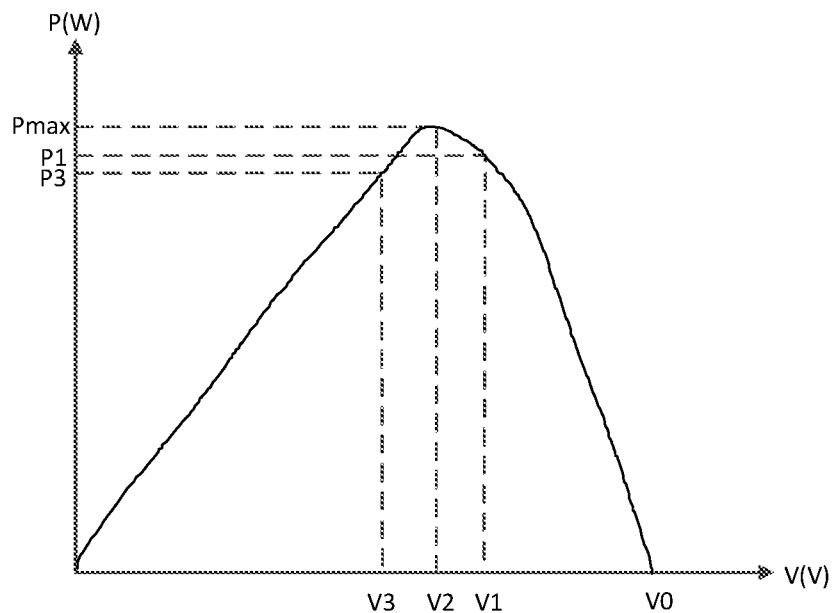
FIG. 1 is a schematic diagram of a curve of an output power of a solar cell varying with an output voltage.
Figure 2:
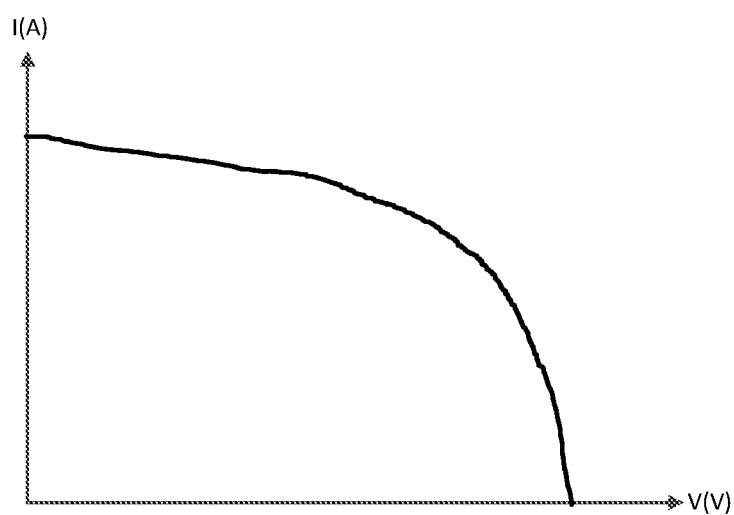
FIG. 2 is a schematic diagram of a curve of an output current of a solar cell varying with an output voltage.

In accompanying drawings, reference numerals representing different components are listed as follows:

100 apparatus for tracking, 10 conversion module, 20 control module, 30 load,

40 solar cell, 11 switching unit, 50 temperature collecting module.

DETAILED DESCRIPTION

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

The following disclosure provides various embodiments or examples to realize different structures of the present disclosure. For simplicity, components and configurations in certain examples will be described in following description. However, they are merely exemplary and not aim at limiting the present disclosure. Additionally, the reference numerals and/or letters may be used repeatedly in different embodiments of the present disclosure, which is only for simplicity and clear and not indicate relationships between the various embodiments and/or configurations.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

A control method for tracking a maximum power point of a solar cell of the present disclosure will be described with reference to the drawings.

Firstly, the control method for tracking a maximum power point of a solar cell according to an embodiment of the present disclosure is described. An output voltage of the solar cell is converted to a voltage required by a load via a conversion module including a switching unit, in which the conversion module may be a DC-high voltage DC inverter.

Figure 3:
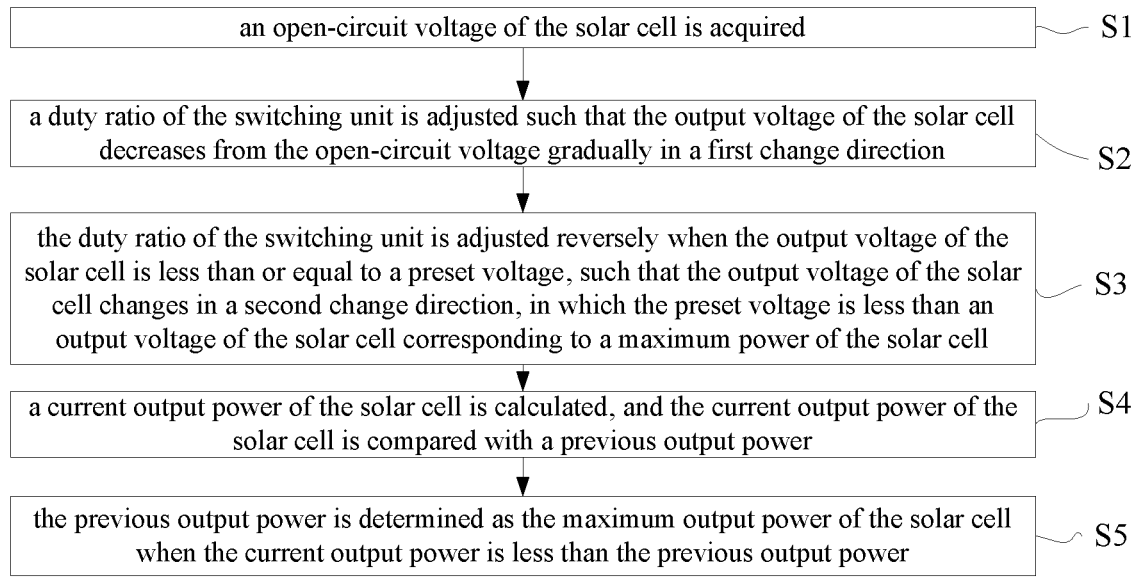
FIG. 3 is a flow chart of a control method for tracking a maximum power point of a solar cell according to an embodiment of the present disclosure.

FIG. 3 is a flow chart of a control method for tracking a maximum power point of a solar cell according to an embodiment of the present disclosure.

As shown in FIG. 3, the control method includes following acts.

In act S1, an open-circuit voltage of the solar cell is acquired.

In act S2, a duty ratio of the switching unit is adjusted such that the output voltage of the solar cell decreases from the open-circuit voltage gradually in a first change direction.

The output voltage and the output current of the solar cell may be changed accordingly by changing the duty ratio of the switching unit in the conversion module (such as an inverter), such that the output power of the solar cell may be changed. For example, as shown in FIG. 1, the output voltage of the solar cell decreases from the open-circuit voltage V0 gradually to left by adjusting a duty ratio of the switching unit.

In act S3, the duty ratio of the switching unit is adjusted reversely when the output voltage of the solar cell is less than or equal to a preset voltage, such that the output voltage of the solar cell changes in a second change direction.

The first change direction is opposite to the second change direction. For example, as shown in FIG. 1, the output voltage of the solar cell may decrease from the open-circuit voltage V0 gradually to left by adjusting the duty ratio of the switching unit; and the output voltage may increase from V3 gradually to right by adjusting the duty ratio of the switching unit of the conversion module such as the inverter, thereby realizing tracking the maximum power point.

It should be noted that the preset voltage is less than an output voltage corresponding to a maximum power of the solar cell. According to characteristics of the solar cell, the output voltage of the solar cell corresponding to a maximum power point of the solar cell is generally in a range of 80±5% of the open-circuit voltage V0 (the output voltage of the solar cell without a load) of the solar cell. Therefore, the preset voltage may be set in a range of 50%-75% of the open-circuit voltage of the solar cell (preferably, the preset voltage may be set in a range of 60%-70% of the open-circuit voltage of the solar cell) according to the characteristics of the solar cell or a technical specification of the solar cell.

In act S4, a current output power of the solar cell is calculated, and the current output power of the solar cell is compared with a previous output power.

By detecting the current output voltage and the current output current of the solar cell, the current output power may be calculated according to the output voltage and the output current. And then the current output power is compared with the previous output power to determine a variation tend of the output power.

In act S5, the previous output power is determined as the maximum output power of the solar cell when the current output power is less than the previous output power.

Act S3 may be performed (i.e., the duty ratio of the switching unit is adjusted reversely) continuously when the current output power of the solar cell is greater than the previous output power.

Referring to the P-V curve shown in FIG. 1, compared to the curve of the output power of the solar cell varying with the output voltage during which the output voltage of the solar cell decreases from the output voltage V1 to the output voltage V2 corresponding to the maximum power Pmax, the curve of the output power of the solar cell varying with the output voltage during which the output voltage of the solar cell increases from the output voltage V3 to the output voltage V2 corresponding to the maximum power Pmax is steeper. Thus, differences between the MPPT method in the related art and the control method for tracking a maximum power point of a solar cell provided in the present disclosure are that there are two control steps to determine the maximum output power of the solar cell: firstly, the output voltage of the solar cell decreases from the open-circuit voltage V0 to the output voltage V2 corresponding to the maximum power Pmax, and then the output voltage of the solar cell increases gradually from the voltage less than V2 (such as the voltage V3 in FIG. 1), for tracking the maximum power, such that the actual maximum power may be tracked more easily.

Advantages of the control method for tracking the maximum power point of the solar cell according to the present disclosure will be described in detail with reference to FIG. 4-6.

Figure 4:
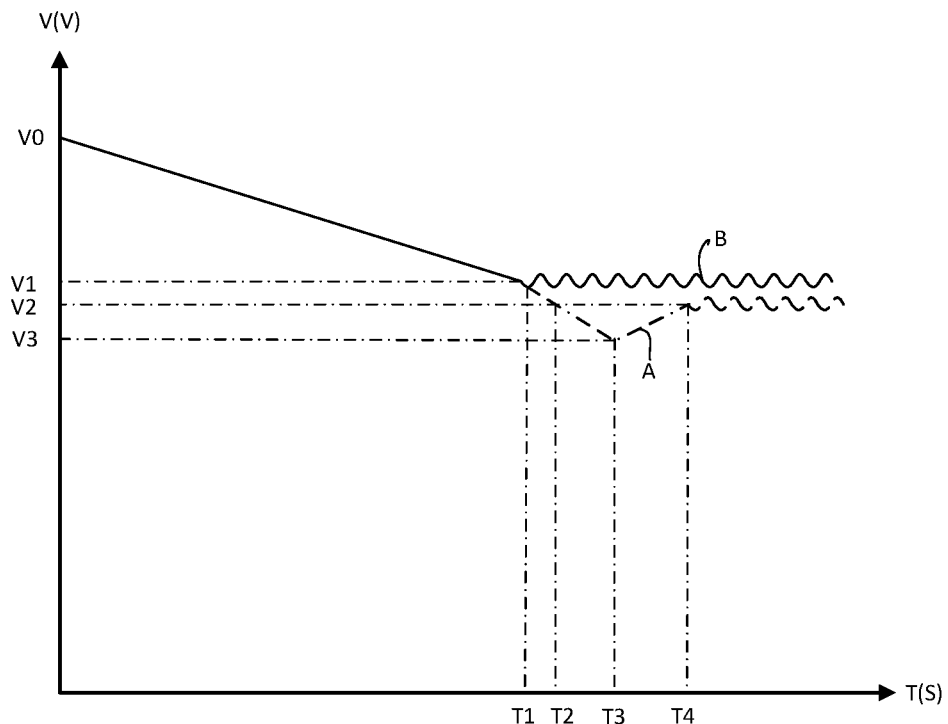
FIG. 4 is a schematic diagram of curves of an output voltage of a solar cell varying with time when the solution in prior art and the solution of the present disclosure are used.

FIG. 4 illustrates a change of an output voltage of a solar cell with time caused by gradually adjusting a duty ratio of the switching unit in the conversion module such as an inverter. The curve A illustrates a curve of the output voltage varying with time obtained when the control method for tracking a maximum power point of a solar cell according to the present disclosure is used, and the curve B illustrates a curve of the output voltage varying with time obtained when the method of the prior art is used. It could be seen that in the prior art, after the output voltage of the solar cell decreases form the open-circuit voltage V0 to V1 corresponding to the time T0, the output voltage of the solar cell would fluctuate around the voltage V1 when the duty ratio of the switching unit in the inverter is controlled to change continuously; however, in the technical solution according to the present disclosure, by adjusting the duty ratio of the switching unit in the inverter, the output voltage of the solar cell decreases to V3 (which is less than the output voltage V2 corresponding to the maximum power point) at the time T3 and then increases gradually from V3 to the output voltage V2 (at the time T4).

Figure 5:
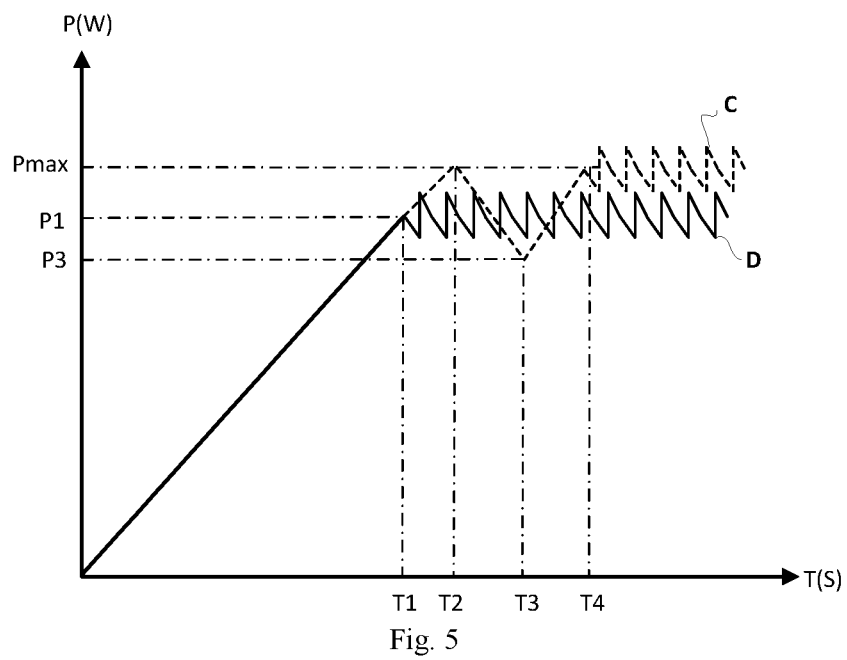
FIG. 5 is a schematic diagram of curves of an output power of a solar cell varying with time when the solution in prior art and the solution of the present disclosure are used.

FIG. 5 illustrates curves of an output power of a solar cell varying with time, in which the curve C is acquired by using the solution of the present disclosure and the curve D is acquired by using the solution in prior art. It could be seen that by using the method in the prior art, the duty ratio of the switching unit in the inverter is controlled to increase gradually, and the output power (current output power) of the solar cell is detected and compared with a previous output power. The duty ratio of the switching unit is increased when the current output power is greater than the previous output power and is decreased when the current output power is less than the previous output power, until the output power reaches a maximum. Thus, the output power may fluctuate after reaching P1 at the time T1, and P1 at T1 may be determined as the maximum power, in which P1 is not the real maximum power and is lower than the maximum power Pmax. However, by using the technical solution of the present disclosure, the output power of the solar cell may reach P1 at T1 (corresponding to the voltage V1 in FIG. 4), reach Pmax at T2 (corresponding to the voltage V2 in FIG. 4), and then reach P3 at T3 (corresponding to the voltage V3 in FIG. 4) and reach Pmax at T4 (corresponding to the voltage V2 in FIG. 4) again, such that the maximum power point Pmax of the solar cell 40 is able to be determined more precisely and easily.

Figure 6:
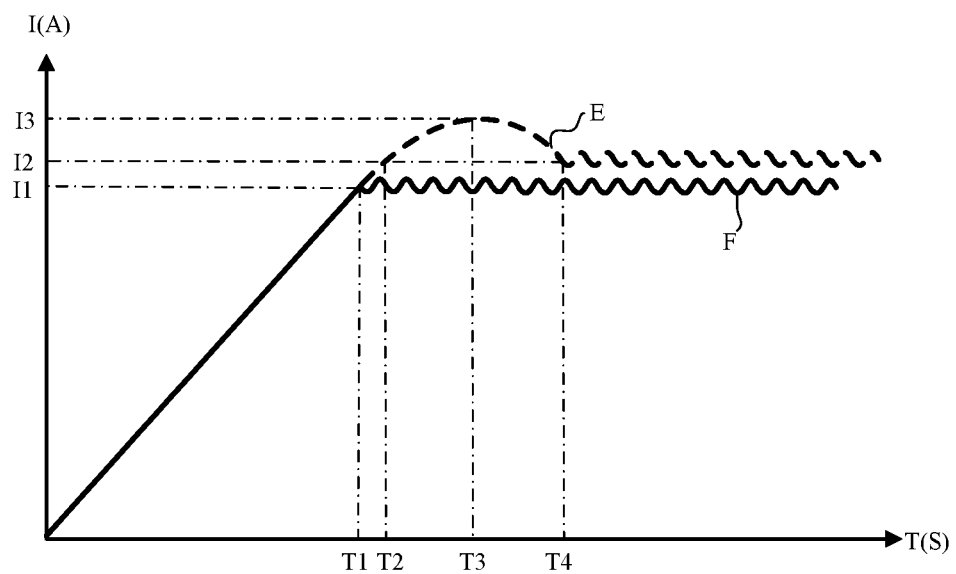
FIG. 6 is a schematic diagram of curves of an output current of a solar cell varying with time when the solution in prior art and the solution of the present disclosure are used.

FIG. 6 illustrates curves of an output current of a solar cell varying with time. Curve E is acquired by using the solution of the present disclosure, and curve F is acquired by using the solution of solution in prior art. It could be seen that by using the solution in prior art, the output current of the solar cell may no longer increase and fluctuate around I1 after the output current increases to I1 at T1. However, by using the solution of the present disclosure, the output current of the solar cell may reach I1 at T1 (corresponding to the voltage V1 in FIG. 4), reach I2 at T2 (corresponding to the voltage V2 in FIG. 4), and then reach I3 at T3 (corresponding to the voltage V3 in FIG. 4), finally decrease to I2 at T4 (corresponding to the voltage V2 in FIG. 4), such that the maximum power Pmax of the solar cell 40 is able to be determined more precisely and easily.

Figure 7:
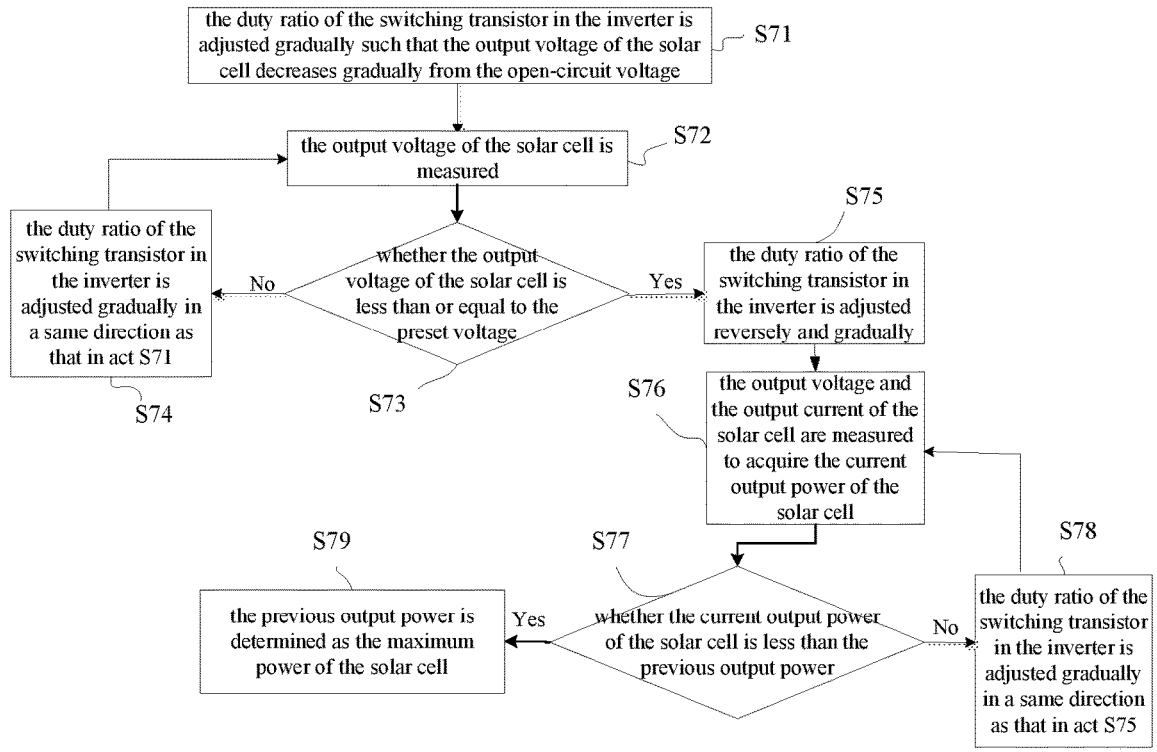
FIG. 7 is a flow chart of a control method for tracking a maximum power point of a solar cell according to a specific embodiment of the present disclosure.

Based on the above description, FIG. 7 is a flow chart of a control method for tracking a maximum power point of a solar cell according to a specific embodiment of the present disclosure. As shown in FIG. 7, the control method includes following acts.

In act S71, the duty ratio of the switching transistor in the inverter is adjusted gradually such that the output voltage of the solar cell decreases gradually from the open-circuit voltage.

In act S72, the output voltage of the solar cell is measured.

In act S73, it is judged whether the output voltage of the solar cell is less than or equal to the preset voltage; if no, act S74 is executed, and if yes, act S75 is executed.

In act S74, the duty ratio of the switching transistor in the inverter is adjusted gradually in a same direction as that in act S71.

In act S75, the duty ratio of the switching transistor in the inverter is adjusted reversely and gradually.

In act S76, the output voltage and the output current of the solar cell are measured to acquire the current output power of the solar cell.

In act S77, it is judged whether the current output power of the solar cell is less than the previous output power; if yes, act S79 is executed, and if the current output power of the solar cell is greater than the previous output power, act S78 is executed.

In act S78, the duty ratio of the switching transistor in the inverter is adjusted gradually in a same direction as that in act S75.

In act S79, the previous output power is determined as the maximum power of the solar cell.

The open-circuit voltage of the solar cell is related to environment temperature. In embodiments of the present disclosure, acquiring the open-circuit voltage of the solar cell includes following acts. The outdoor environment temperature is acquired, and a change rate of the outdoor environment temperature is calculated. The open-circuit voltage of the solar cell is periodically collected according to the change rate of the outdoor environment temperature. Specifically, the open-circuit voltage of the solar cell is periodically collected, the open-circuit voltage of the solar cell may be updated continually when the maximum power is tracked so as to ensure the precision of tracking the maximum power. A cycle of collecting the open-circuit voltage is related to a change rate of the outdoor environment temperature. The cycle of collecting the open-circuit voltage is shortened when the outdoor environment temperature changes quickly, and the cycle of collecting the open-circuit voltage may be prolonged when the outdoor environment temperature changes slowly. Thus, the open-circuit voltage of the solar cell may be acquired in time and more precisely, such that the precision of tracking the maximum power point may be ensured.

Further, the duty ratio of the switching unit is controlled after the maximum power of the solar cell is determined, such that the output voltage of the solar cell fluctuates within the first preset range of the output voltage corresponding to the maximum power, and the output current of the solar cell fluctuates within the second preset range of the output current corresponding to the maximum power. Specifically, as shown in FIG. 4-6, MPPT control unit may control the duty ratio of the conversion module such as the inverter after the maximum power point of the solar cell is tracked, such that the output power of the solar cell may fluctuate around the maximum power point, which means that the output power of the solar cells maintains a dynamic balance at the maximum power point. As shown in the curve of the output power of the solar cell varying with time illustrated in FIG. 5, the output power of the solar cell may maintain fluctuating around the maximum power point Pmax after the time T1 (for the prior art) and the time T4 (for the present application). The output power of the solar cell may maintain fluctuating at the maximum power point after the maximum power point is detected either in the prior art or in the present disclosure. Therefore, when the output power of the solar cell is changed because of a change of external condition (such as illumination intensity, temperature etc.) or a change of a load, a next maximum power point may be determined in time and precisely. Accordingly, as shown in FIG. 4 and FIG. 6, the output voltage and the output current of the solar cell may maintain fluctuating at the output voltage and the output current corresponding to the maximum power point of the solar cell so as to maintain the dynamic balance at there after the maximum power point of the solar cell is detected.

Based on the above description, an apparatus for tracking a maximum power point of a solar cell according to another aspect of the present disclosure will be described in detail as follows.

Figure 8:
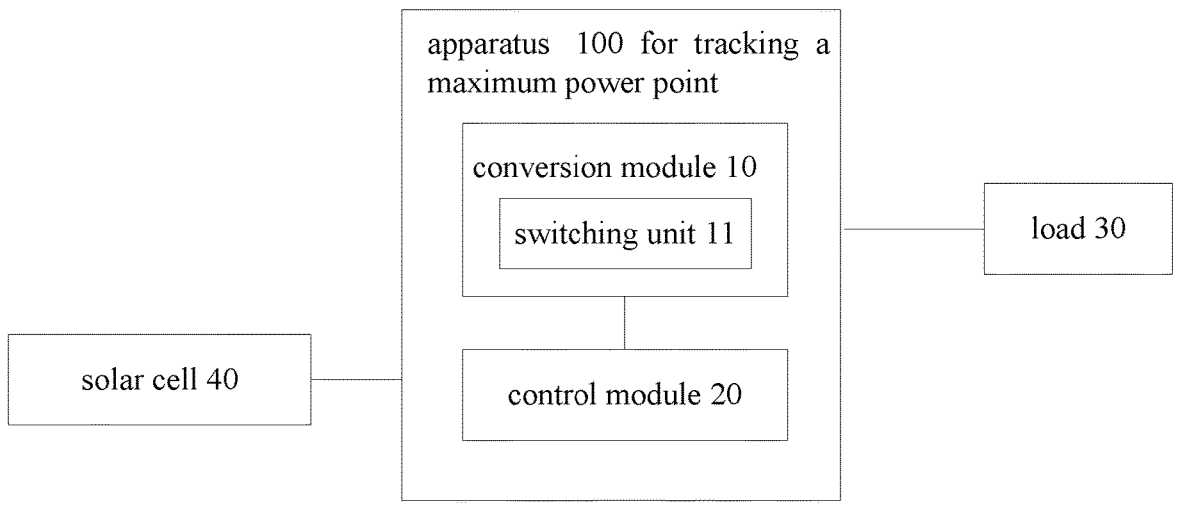
FIG. 8 is a block diagram of an apparatus for tracking a maximum power point of a solar cell according to an embodiment of the present disclosure.

FIG. 8 is a block diagram of an apparatus for tracking a maximum power point of a solar cell according to an embodiment of the present disclosure. As shown in FIG. 8, the apparatus 100 includes a conversion module 10 and a control module 20.

The conversion module 10 includes a switching unit 11. Since an open-circuit voltage of the solar cell 40 is usually 15-36V, preferably, the conversion module 10 may be a DC-high voltage DC inverter, configured to convert an output voltage of the solar cell 40 to a voltage required by a load 30, such as the voltage desired by a DC inverter air conditioner.

The control module 20, such as an MPPT controller, is configured to acquire the open-circuit voltage of the solar cell 40, to adjust a duty ratio of the switching unit 11 in the conversion module 10 such that the output voltage of the solar cell 40 decreases from the open-circuit voltage gradually in a first change direction, to reversely adjust the duty ratio of the switching unit 11 when the output voltage of the solar cell 40 is less than or equal to a preset voltage, such that the output voltage of the solar cell 40 changes in a second change direction, in which the first change direction is opposite to the second change direction, to calculate a current output power of the solar cell 40, and to compare the current output power with a previous output power, and to determine the previous output power as the maximum output power of the solar cell 40 when the current output power is less than the previous output power.

It should be noted that the preset voltage is less than an output voltage of the solar cell 40 corresponding to a maximum power of the solar cell 40. According to characteristics of the solar cell 40, the output voltage of the solar cell 40 corresponding to a maximum power point of the solar cell 40 is generally in a range of 80±5% of the open-circuit voltage V0 (the output voltage of the solar cell without a load) of the solar cell 40. Therefore, the preset voltage may be set in a range of 50%-75% of the open-circuit voltage of the solar cell 40 (preferably, the preset voltage may be set in a range of 60%-70% of the open-circuit voltage of the solar cell 40) according to the characteristics of the solar cell 40 or a technical specification of the solar cell 40.

Specifically, a tracking process controlled by the control module 20 such as the MPPT controller will be described as follows: (1) the duty ratio of the switching transistor in the conversion module 10 (i.e., the inverter) is changed gradually such that the output voltage of the solar cell 40 decreases gradually from the open-circuit voltage of the solar cell 40; (2) the output voltage of the solar cell 40 is measured and the measured output voltage of the solar cell 40 is compared with a preset voltage; (3) the duty ratio of the switching transistor is adjusted reversely when the output voltage of the solar cell 40 is less than or equal to the preset voltage, and the output voltage and the output current of the solar cell 40 are measured so as to acquire the output power (current output power) of the solar cell 40 and the current output power of the solar cell 40 is compared with a previous output power; and (4) the duty ratio of the switching transistor is reversely adjusted continuously when the current output power of the solar cell 40 is greater than the previous output power of the solar cell 40, and the previous output power is determined as the maximum power of the solar cell 40 when the current output power of the solar cell 40 is less than the previous output power of the solar cell 40.

It could be seen that, differences between the MPPT technology in the related art and the apparatus 100 for tracking a maximum power point of a solar cell provided in the present disclosure are that, there are two control steps performed by the control module 20 to determine the maximum output power of the solar cell 40: firstly, the output voltage of the solar cell 40 is controlled to decrease from the open-circuit voltage to the output voltage corresponding to the maximum power Pmax, and then the output voltage of the solar cell is controlled to increase gradually from the voltage less than V2 (such as the voltage V3 in FIG. 1) so as to track the maximum power, such that the actual maximum power may be tracked more easily.

Figure 9:
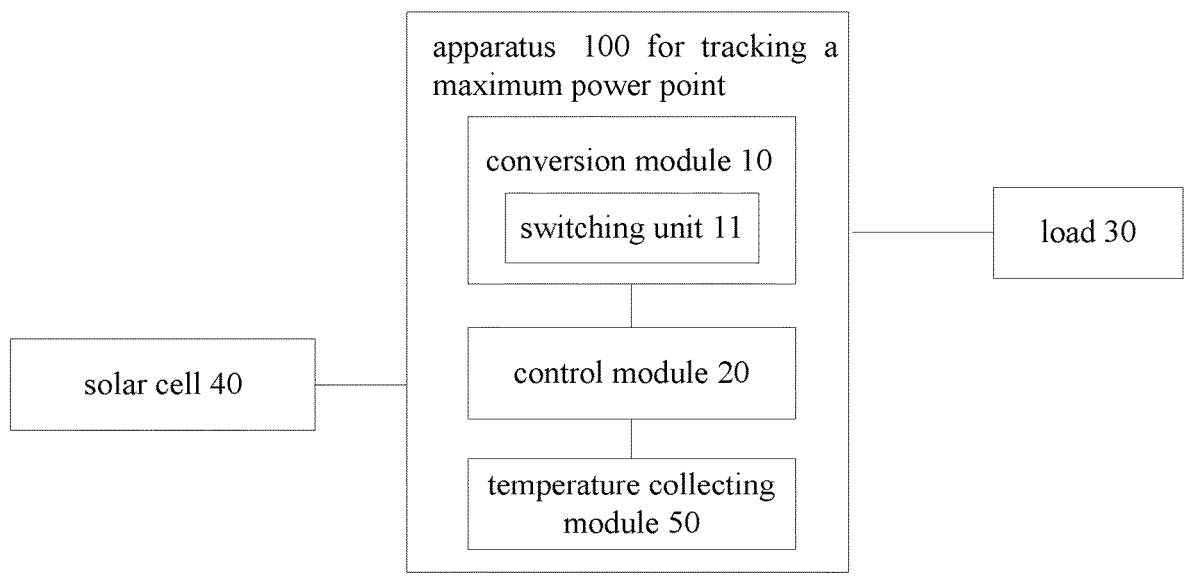
FIG. 9 is a block diagram of an apparatus for tracking a maximum power point of a solar cell according to another embodiment of the present disclosure.

The open-circuit voltage of the solar cell 40 is related to environment temperature. In embodiments of the present disclosure, as shown in FIG. 9, the apparatus 100 also includes a temperature collecting module 50, configured to acquire an outdoor environment temperature, such that the control module 20 may calculate a change rate of the outdoor environment temperature and periodically collect the open-circuit voltage of the solar cell 40 according to the change rate of the outdoor environment temperature. Specifically, the open-circuit voltage of the solar cell 40 is periodically collected, the open-circuit voltage of the solar cell 40 may be updated continually when the maximum power is tracked so as to ensure the precision of tracking the maximum power. A cycle of collecting the open-circuit voltage is related to a change rate of the outdoor environment temperature. The cycle of collecting the open-circuit voltage is shortened when the outdoor environment temperature changes quickly, and the cycle of collecting the open-circuit voltage may be prolonged when the outdoor environment temperature changes slowly. Thus, the open-circuit voltage of the solar cell may be acquired in time and more precisely, such that the precision of tracking the maximum power point may be ensured.

Further, as shown in FIG. 4-6, the control module 20 may be configured to control the duty ratio of the switching unit 11 after the maximum power of the solar cell 40 is determined, such that the output voltage of the solar cell 40 fluctuates within a first preset range of the output voltage corresponding to the maximum power and an output current of the solar cell 40 fluctuates within a second preset range of the output current corresponding to the maximum power, which means that the output voltage of the solar cell 40 may maintain a dynamic balance at the output voltage corresponding to the maximum power point and the output current of the solar cell 40 may maintain a dynamic balance at the output current corresponding to the maximum power point. Therefore, when the output power of the solar cell 40 is changed because of a change of external condition (such as illumination intensity, temperature etc.) or a change of the load 30, a next maximum power point may be determined in time and precisely.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A control method for tracking a maximum power point of a solar cell, being characterized at that, an output voltage of the solar cell is converted to a voltage required by a load via a conversion module comprising a switching unit, and the control method comprises:
   acquiring an open-circuit voltage of the solar cell;
   adjusting a duty ratio of the switching unit such that the output voltage of the solar cell decreases from the open-circuit voltage gradually in a first change direction;
   reversely adjusting the duty ratio of the switching unit when the output voltage of the solar cell is less than or equal to a preset voltage, such that the output voltage of the solar cell changes in a second change direction, wherein the preset voltage is less than an output voltage corresponding to a maximum power of the solar cell, and the first change direction is opposite to the second change direction;
   calculating a current output power of the solar cell, and comparing the current output power of the solar cell with a previous output power; and
   determining the previous output power as a maximum output power of the solar cell when the current output power is less than the previous output power;
   wherein acquiring the open-circuit voltage of the solar cell comprises:
   acquiring an outdoor environment temperature, and calculating a change rate of the outdoor environment temperature; and
   periodically collecting the open-circuit voltage of the solar cell according to the change rate of the outdoor environment temperature.

2. The control method according to claim 1, being characterized at that, the preset voltage is 50%-75% of the open-circuit voltage of the solar cell.

3. The control method according to claim 1, being characterized at that, the preset voltage is 60%-70% of the open-circuit voltage of the solar cell.

4. The control method according to claim 1, being characterized at that, after the maximum power of the solar cell is determined, the control method further comprises:
   controlling the duty ratio of the switching unit, such that the output voltage of the solar cell fluctuates within a first preset range of the output voltage corresponding to the maximum power and an output current of the solar cell fluctuates within a second preset range of an output current corresponding to the maximum power.

5. An apparatus for tracking a maximum power point of a solar cell, being characterized at, comprising:
   a conversion module comprising a switching unit, configured to convert an output voltage of the solar cell to a voltage required by a load;
   a temperature collecting module configured to acquire an outdoor environment temperature; and
   a control module, configured to:
   acquire an open-circuit voltage of the solar cell;
   adjust a duty ratio of the switching unit such that the output voltage of the solar cell decreases from the open-circuit voltage gradually in a first change direction;
   reversely adjust the duty ratio of the switching unit when the output voltage of the solar cell is less than or equal to a preset voltage, such that the output voltage of the solar cell changes in a second change direction, wherein the preset voltage is less than an output voltage corresponding to a maximum power of the solar cell, and the first change direction is opposite to the second change direction;
   calculate a current output power of the solar cell, and compare the current output power of the solar cell with a previous output power;
   determine the previous output power as a maximum output power of the solar cell if the current output power is less than the previous output power; and
   calculate a change rate of the outdoor environment temperature and to periodically collect the open-circuit voltage of the solar cell according to the change rate of the outdoor environment temperature.

6. The apparatus according to claim 5, being characterized at that, the preset voltage is 50%-75% of the open-circuit voltage of the solar cell.

7. The apparatus according to claim 5, being characterized at that, the preset voltage is 60%-70% of the open-circuit voltage of the solar cell.

8. The apparatus according to claim 5, being characterized at that, the control module is configured to control the duty ratio of the switching unit after the maximum power of the solar cell is determined, such that the output voltage of the solar cell fluctuates within a first preset range of the output voltage corresponding to the maximum power and an output current of the solar cell fluctuates within a second preset range of an output current corresponding to the maximum power.

* * * * *